June 26, 1962
L. C. WHITE
3,041,085
MOTORIZED CARRIER
Filed Sept. 30, 1960
2 Sheets-Sheet 1
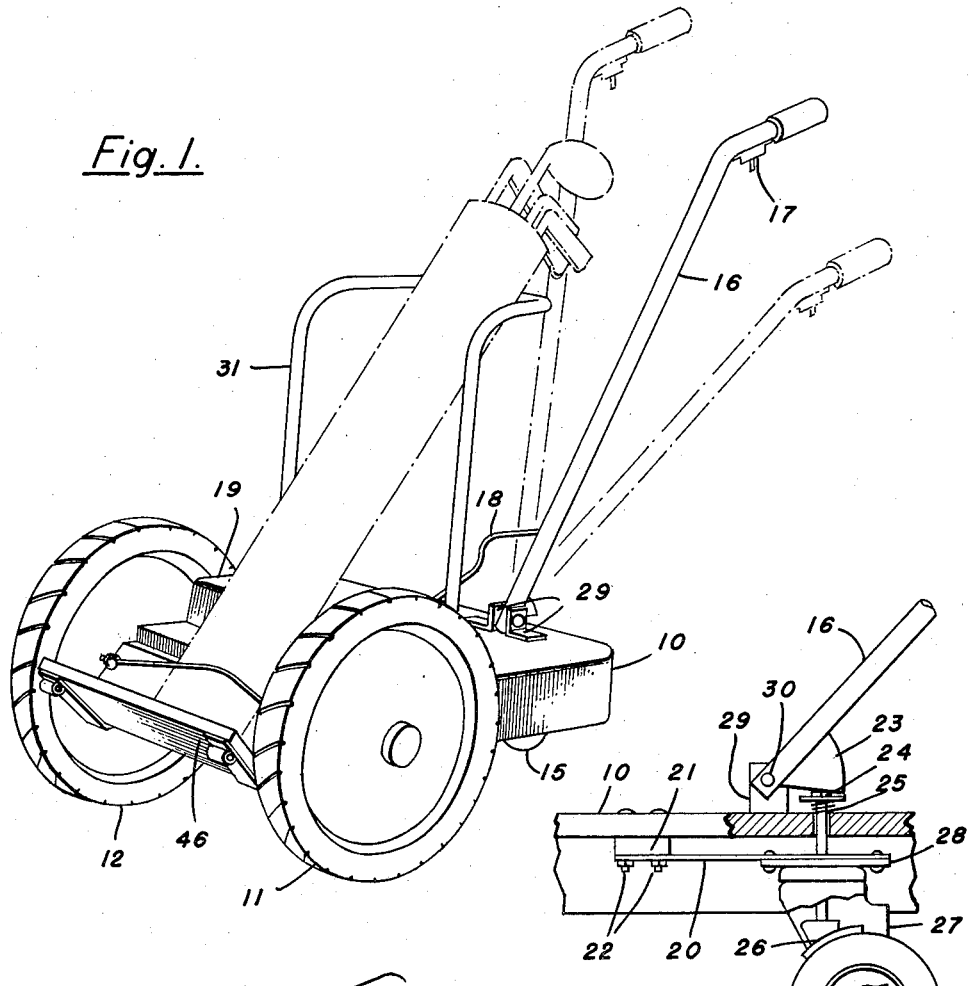
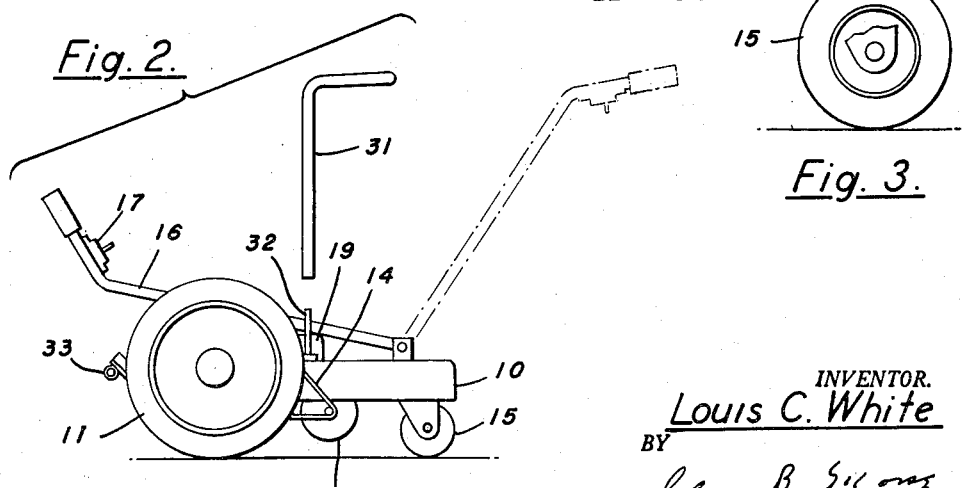
INVENTOR.
Louis C. White
BY
Attorney

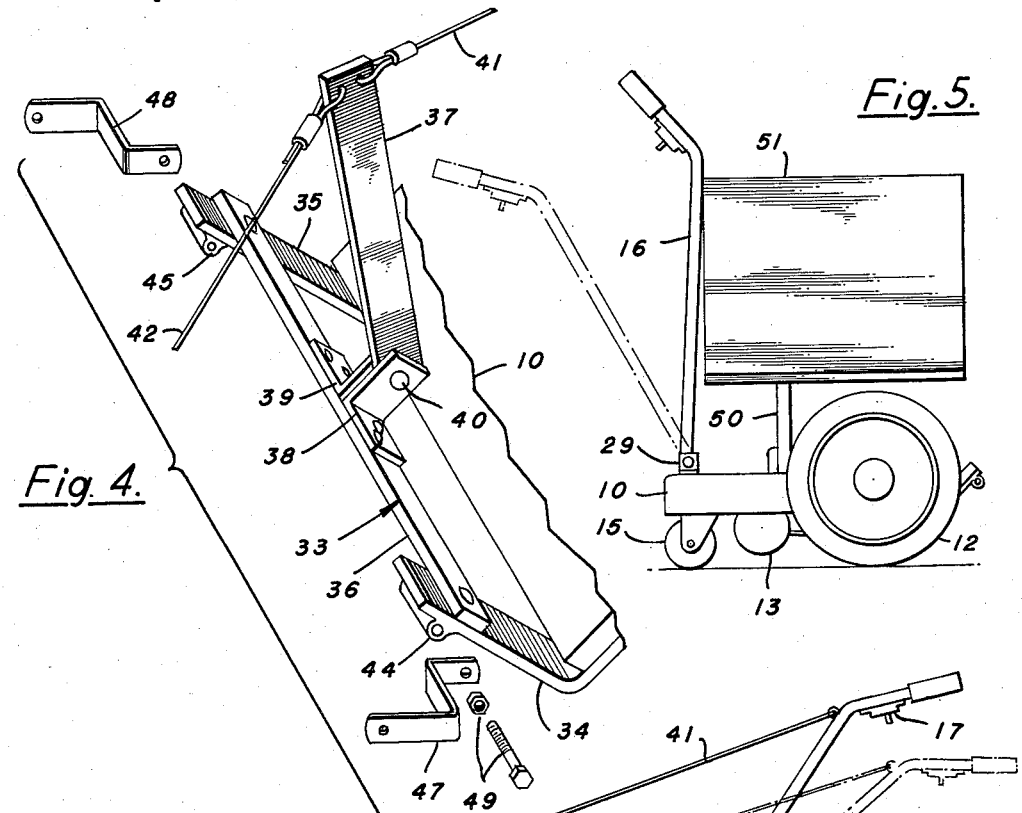
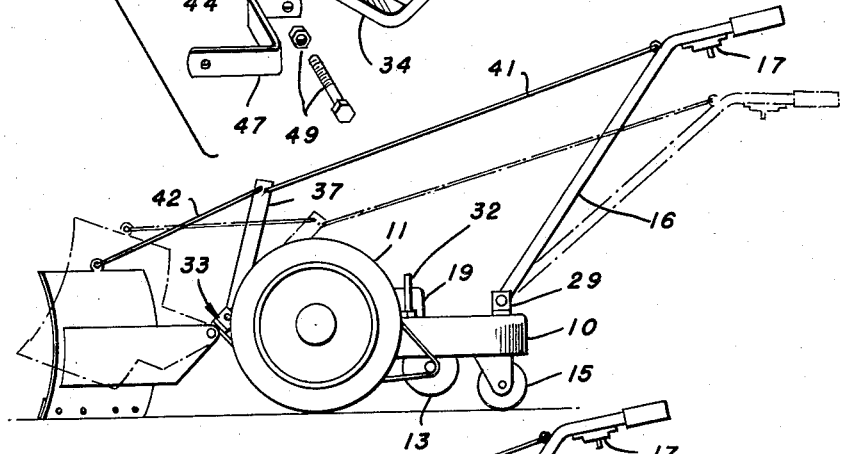
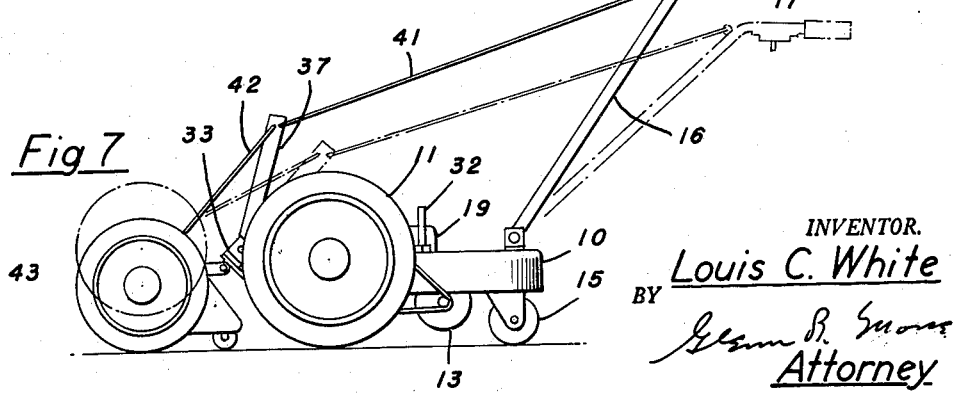

United States Patent Office 3,041,085
Patented June 26, 1962

3,041,085
MOTORIZED CARRIER
Louis C. White, 1015 San Jose Drive, SE.,
Grand Rapids, Mich.
Filed Sept. 30, 1960, Ser. No. 59,634
2 Claims. (Cl. 280—47.37)

This invention provides a carrier vehicle having a wide variety of utility. A portion of the structure is conventional, and includes a frame supported on wheels. This structure is preferably equipped with an electric motor and storage battery for supplying motive power to the wheels. The invention provides several novel features associated with the basic conventional structure, among these being an arrangement for controlling a powered attachment, a brake system operable by the same handle movement that positions the power attachment, and a superstructure for increasing the general utility of the machine.

The several features of the invention will be analyzed in further detail through a discussion of the particular embodiments illustrated in the accompanying drawings. In the drawings:

FIGURE 1 presents a perspective view of a machine adapted for use as a carrier for golf bags, the bag and a set of clubs being shown in dotted lines.

FIGURE 2 presents a side elevation on a reduced scale of the device shown in FIGURE 1, and illustrating the folded position.

FIGURE 3 presents a fragmentary sectional view on an enlarged scale and illustrating the brake mechanism incorporated in the device shown in FIGURES 1 and 2.

FIGURE 4 presents an exploded view of the bracket-structure used for supporting an attachment driven by the machine.

FIGURE 5 presents a side elevation of a modified form of the machine involving a carrying container.

FIGURE 6 presents a side elevation of the machine adapted for handling a snowplow on a bracket of the type illustrated in FIGURE 4.

FIGURE 7 illustrates the mounting and handling of a mowing attachment on the bracket illustrated in FIGURE 4.

Referring to FIGURES 1 and 2, the machine includes a frame 10 of any convenient form of construction. This portion of the machine may be a unitary casting, or may be fabricated from sheet material. The wheels 11 and 12 are rotatably mounted on the frame 10, and the motor 13 is also secured to the frame 10 in a conventional manner. The motor 13 drives the wheels 11 and 12 through the belt 14. The wheels 11 and 12 may either be secured to a common shaft, or may rotate freely with respect to each other. In the latter case, the drive would preferably include a conventional differential driven by the belt 14. The opposite end of the vehicle from the wheels 11 and 12 is supported by the castering wheel 15.

The machine is steered and controlled through manipulation of the handle 16. A switch 17 is connected through wires 18 traversing the tubular handle 16, and connected through conventional circuitry with the motor 13 and a conventional battery within the housing 19. To give some degree of resilience to the castering wheel 15, it is preferably mounted on a leaf spring 20 secured to the abutment 21 on the main frame 10 with the bolts 22.

A braking action is provided in the structure outlined above as shown in FIGURE 3. The handle 16 has a lateral projection 23 secured to it in position to bear upon the head of the rod 24 as the handle is rotated in a clockwise direction, as viewed in FIGURE 3. This movement causes a corresponding downward movement of the bolt 24 against the action of the spring 25, causing the shoe 26 to bear upon the surface of the wheel 15, and thereby create the braking action. It should be noted that the weight of the handle 16 tends to establish a braking action automatically as soon as the operator's grip on the handle is released. The castering wheel 15 is mounted on a conventional fork 27 rotatably mounted on the plate 28 secured to the spring 20.

The pivotal mounting of the handle with respect to the frame 10 can be provided by a very simple structure involving the angle brackets 29 and the pivot pin 30. To provide as compact a folded position of the machine as possible for storage and transportation (as in the trunk of an automobile) the pivotal mounting of the handle may be utilized by rotating the handle in a counterclockwise direction, as shown in FIGURE 2. Prior to this movement, the tubular rack 31 is disengaged from the vertical parallel studs 32 by merely pulling the rack upwardly. The studs 32 extend to a height below the plane of tangency of the top of the wheels 11 and 12. The handle 16 is then swung into the full-line position illustrated in FIGURE 2, followed by placing the rack 31 on the top of the frame 10 in a convenient position.

Referring to FIGURES 4, 6, and 7, the bracket assembly generally indicated at 33 includes the arms 34 and 35 secured to the frame 10 of the machine. The connecting bar 36 provides for the pivotal support of the radius arm or spreader 37 between the angles 38 and 39 on the pin 40. The cable 41 extends to a point of connection with the handle 16, and the cable 42 may be connected to a snowplow blade as shown in FIGURE 6. A reel-type mower unit 43 or some other appliance may also be supported on the bracket assembly 33 in the same manner as the snowplow. In both of these arrangements, the attachments are pivotally mounted through the installation of suitable bolts through the sleeves 44 and 45. A supporting shelf 46 (refer to FIGURE 1) for receiving a golf bag may be secured to the arms 34 and 35 in place of the connecting bar 36. The Z-shaped members 47 and 48 may be secured at the sleeves 44 and 45 by bolt and nut assemblies as indicated at 49 when it is desired to increase the span between the points of support for accommodating particular attachments.

It should be noted that the presence of the wheels of the mowing attachment 43 in engagement with the ground would render the steering of the machine very difficult. Raising the mowing attachment to the dotted line position shown in FIGURE 7 by placement of the handle in the dotted line position will make the turning a very simple operation, due to the presence of the castering wheel 15. In such an arrangement, the turning radius is practically zero. A similar effect is to be found in connection with the snowplow arrangement illustrated in FIGURE 6.

Referring to FIGURE 5, a modified superstructure is illustrated involving tubular legs 50 for engaging the studs 32. These legs support a container 51 of convenient dimensions for converting the unit to a carrier for bulk items. In slightly modified forms, the device may be usable as a powered carrier for individual heavy items by replacing the container 51 with a table surface. In this form, the device becomes valuable for transporting heavy objects such as stamping and forming dies from place to place in a factory.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A collapsible carrier vehicle, comprising: frame means; supporting wheel means mounted on said frame means and extending normally below and above said frame means; handle means pivotally mounted on said frame means on a normally horizontal axis of rotation; spaced projections secured to said frame means and extending normally upwardly therefrom to a position below a plane tangent to the top of said wheel means, said handle being rotatable forwardly to a position between said wheel means and said projections; and rack means having tubular portions axially engageable and disengageable with said projections.

2. A collapsible carrier vehicle, comprising: frame means; supporting wheel means mounted on said frame means; handle means pivotally mounted on said frame means on a normally horizontal axis of rotation; spaced projections secured to said frame means and extending normally upwardly therefrom, said handle being rotatable forwardly to a position between said wheel means and said projections; and rack means having tubular portions axially engageable and disengageable with said projections.

References Cited in the file of this patent

UNITED STATES PATENTS

| | | |
|---|---|---|
| 1,370,538 | Hogg | Mar. 8, 1921 |
| 2,821,258 | Benson et al. | Jan. 28, 1958 |
| 2,840,384 | Bard | June 24, 1958 |
| 2,858,141 | Ertsgaard et al. | Oct. 28, 1958 |